United States Patent
Yan

(10) Patent No.: US 7,465,690 B2
(45) Date of Patent: Dec. 16, 2008

(54) METHODS FOR MAKING A CATALYTIC ELEMENT, THE CATALYTIC ELEMENT MADE THEREFROM, AND CATALYZED PARTICULATE FILTERS

(75) Inventor: Jiyang Yan, Broken Arrow, OK (US)

(73) Assignee: Umicore AG & Co. Kg, Hanau (DE)

( * ) Notice: Subject to any disclaimer, the term of this patent is extended or adjusted under 35 U.S.C. 154(b) by 192 days.

(21) Appl. No.: 10/600,420

(22) Filed: Jun. 19, 2003

(65) Prior Publication Data

US 2004/0259731 A1    Dec. 23, 2004

(51) Int. Cl.
*B01J 23/00* (2006.01)
*B01J 23/40* (2006.01)
*B01J 23/42* (2006.01)
*B01J 23/10* (2006.01)
*B01J 23/58* (2006.01)
*B01J 23/72* (2006.01)
*B01J 23/56* (2006.01)
*B01J 23/44* (2006.01)
*B01J 23/74* (2006.01)
*B01D 50/00* (2006.01)
*B01D 53/34* (2006.01)
*B01D 39/06* (2006.01)
*B01D 39/20* (2006.01)
*B01D 39/00* (2006.01)
*B01D 41/00* (2006.01)

(52) U.S. Cl. ............... 502/325; 502/326; 502/327; 502/302; 502/303; 502/304; 502/330; 502/331; 502/332; 502/333; 502/334; 502/335; 502/336; 502/337; 502/338; 502/339; 422/177; 422/180; 55/523; 55/282.3

(58) Field of Classification Search ......... 502/325–327, 502/302–304, 330–339; 422/177, 180; 55/523, 55/282.3
See application file for complete search history.

(56) References Cited

U.S. PATENT DOCUMENTS

| | | | |
|---|---|---|---|
| 4,329,162 A | * | 5/1982 | Pitcher, Jr. .................. 55/523 |
| 4,455,393 A | | 6/1984 | Domesle et al. |
| 4,510,265 A | | 4/1985 | Hartwig |
| 4,545,758 A | | 10/1985 | Nakamura et al. |
| 4,727,052 A | * | 2/1988 | Wan et al. .................... 502/327 |

(Continued)

FOREIGN PATENT DOCUMENTS

CA     2299602    *    2/2000

(Continued)

*Primary Examiner*—Jerry Lorengo
*Assistant Examiner*—Patricia L Hailey
(74) *Attorney, Agent, or Firm*—Smith, Gambrell & Russell, LLP

(57) ABSTRACT

In one embodiment, a method for making a catalytic element comprises forming a first slurry of a promoter oxide precursor and a refractory inorganic oxide and calcining the first slurry to form a supported promoter. The supported promoter and a noble metal solution are combined to form a second slurry that is calcined to form a catalyst composition. The catalyst composition is applied to a substrate and the substrate is calcined to form the catalytic element. In one embodiment, the catalyzed particulate filter comprises a shell disposed around the catalytic element, wherein the shell has an inlet and an outlet, and a retention member disposed between at least a portion of the shell and the catalytic element.

11 Claims, 6 Drawing Sheets

U.S. PATENT DOCUMENTS

| | | | |
|---|---|---|---|
| 4,759,918 A | 7/1988 | Homeier et al. | |
| 4,828,807 A | 5/1989 | Domesle et al. | |
| 4,900,517 A | 2/1990 | Domesle et al. | |
| 4,902,487 A | 2/1990 | Cooper et al. | |
| 5,064,803 A * | 11/1991 | Nunan | 502/170 |
| 5,100,632 A | 3/1992 | Dettling et al. | |
| 5,855,854 A * | 1/1999 | Shinzawa et al. | 422/177 |
| 6,013,599 A | 1/2000 | Manson | |
| 6,023,928 A | 2/2000 | Peter-Hoblyn et al. | |
| 6,159,430 A | 12/2000 | Foster et al. | 422/179 |
| 6,248,689 B1 * | 6/2001 | Manson | 502/340 |
| 6,338,827 B1 | 1/2002 | Nelson | 422/186.04 |
| 6,354,903 B1 | 3/2002 | Nelson | 445/58 |
| 6,361,821 B1 | 3/2002 | Anderson et al. | 427/58 |
| 6,391,822 B1 | 5/2002 | Dou et al. | 502/325 |
| 6,438,839 B1 | 8/2002 | Hardesty et al. | 29/890 |
| 6,455,463 B1 | 9/2002 | Labarge et al. | 502/340 |
| 6,464,945 B1 | 10/2002 | Hemingway | 422/174 |
| 6,464,947 B2 | 10/2002 | Balland | 422/180 |
| 6,475,951 B1 * | 11/2002 | Domesle et al. | 502/325 |
| 6,497,847 B2 | 12/2002 | Foster et al. | 422/177 |
| 6,532,659 B1 | 3/2003 | DeSousa et al. | 29/890 |
| 6,591,497 B2 | 7/2003 | Foster et al. | 29/890 |
| 6,605,259 B1 | 8/2003 | Henry | 422/179 |
| 6,613,299 B2 * | 9/2003 | Dang et al. | 423/239.1 |
| 6,623,704 B1 | 9/2003 | Roth | 422/179 |
| 6,624,113 B2 | 9/2003 | Labarge et al. | 502/344 |
| 6,643,928 B2 | 11/2003 | Hardesty et al. | 29/890 |
| 6,764,664 B2 * | 7/2004 | Zhang | 423/215.5 |
| 6,770,252 B2 * | 8/2004 | Cheng | 423/239.1 |
| 6,827,754 B2 * | 12/2004 | Suwabe et al. | 55/523 |
| 2002/0187894 A1 * | 12/2002 | Domesle et al. | 502/304 |
| 2003/0124037 A1 * | 7/2003 | Voss et al. | 422/177 |
| 2003/0171216 A1 * | 9/2003 | Park | 502/355 |

FOREIGN PATENT DOCUMENTS

| | | |
|---|---|---|
| EP | 0 092 023 A1 | 10/1983 |
| EP | 0 160 482 B1 | 11/1985 |
| EP | 0 369 163 A1 | 5/1990 |
| WO | WO 00/03790 | 1/2000 |
| WO | WO 00/29726 | 5/2000 |
| WO | WO 01/02083 A1 | 1/2001 |

* cited by examiner

METHODS FOR MAKING A CATALYTIC ELEMENT, THE CATALYTIC ELEMENT MADE THEREFROM, AND CATALYZED PARTICULATE FILTERS

BACKGROUND

In order to meet exhaust gas emission standards, the exhaust emitted from internal combustion engines is treated prior to release into the atmosphere. Exhaust is passed through a catalytic element to remove undesirable gaseous emission components such as unburned hydrocarbons (HC), carbon monoxide (CO), and nitrogen oxides (NOx). In addition to the gaseous components, exhaust gases, especially diesel engine exhaust, also contain solid particulate matter. The main component of solid particulate matter (PM) is carbon soot. Other PM includes soluble organic fractions (SOF) and sulfate ($H_2SO_4$) that are usually absorbed on carbon particles and contribute to the total mass of the PM. A particulate filter, which has the capability to trap or adsorb PM, can be used with compression ignition engines to prevent PM from exiting the tailpipe. Carbon particles and SOF are stored in the filter and then burned so that the filter is regenerated and able to again store more PM. In an uncatalyzed diesel particulate filter, the filter gradually fills with particulate matter. Two things may happen when the filter is loaded with a significant amount of particulate matter. First, the backpressure of the exhaust line may become too high and cause the engine to stall. Second, the engine load may increase significantly and generate enough heat so that the exhaust temperature exceeds the ignition temperature of carbon. The trapped carbon will then automatically combust and the filter will self-clean. In the later case, however, although the engine will still run, it may cause a significant loss of power, and a high fuel economy penalty due to that high backpressure generated from exhaust line. It is thus desirable to reduce the ignition temperature (also called "lightoff" temperature in engine exhaust after-treatment industry) to a lower level so that the soot can continuously or periodically burn off at the normal engine operating conditions.

To reduce the ignition temperature of diesel soot and to lower the temperature for diesel particulate filter regeneration, several catalyst systems have been developed for use in catalyzed diesel particulate filters. Eutectic salts such as $KVO_3$ (potassium vanadate) and $CsVO_3$ (cesium vanadate) are efficient diesel soot oxidation catalysts that reduce soot ignition temperatures and increase soot combustion rates. Other prior approaches include the use of catalysts containing noble metals and various other components such as alkaline earth metal oxides, cerium components, and copper and iron compounds, for example. While several combinations of catalyst materials have been disclosed, there has been little or no emphasis on methods of making catalyzed diesel particulate filters with improved catalytic performance and stability.

There thus remains a need for catalytic device for catalytic elements, for catalyzed diesel particulate filters, and for methods of making catalyzed diesel particulate filters that have good catalytic properties and stability.

SUMMARY

Disclosed herein are methods for making catalytic elements, catalytic elements made therefrom, and catalyzed particulate filters. In one embodiment, a method for making a catalytic element comprises forming a first slurry of a promoter oxide precursor and a refractory inorganic oxide and calcining the first slurry to form a supported promoter. The supported promoter and a noble metal solution are combined to form a second slurry that is calcined to form a catalyst composition. The catalyst composition is applied to a substrate and the substrate is calcined to form the catalytic element.

In another embodiment, the method for making a catalytic element comprises forming a catalyst composition from a slurry comprising a noble metal precursor and a refractory inorganic oxide component, and controlling an average composition particle size of the catalyst composition, wherein the catalyst composition further comprises at least one of a promoter oxide and a promoter oxide precursor. The catalyst composition is applied to a substrate and the substrate is calcined to form the catalytic element.

In one embodiment, the catalyzed particulate filter comprises a shell disposed around the catalytic element, wherein the shell has an inlet and an outlet, and a retention member disposed between at least a portion of the shell and the catalytic element.

The above described and other features are exemplified by the following figures and detailed description.

DETAILED DESCRIPTION

Figure 1:
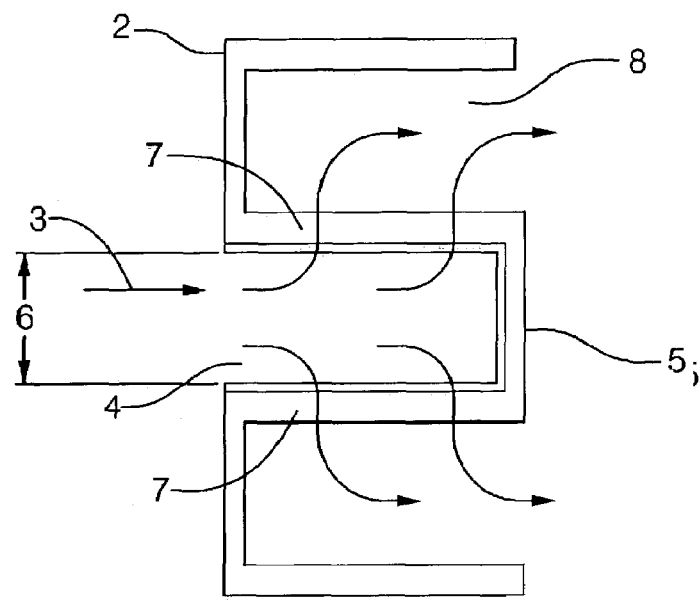
FIG. 1 shows an expanded view of a section of a wall flow diesel particulate filter treatment element.

A diesel particulate filter (DPF) is a structure that can be placed in fluid communication with an exhaust stream to trap and combust particulate emission components such as soot. A catalyst composition for purification of exhaust gases is a composition that catalyzes the removal of pollutants from exhaust gas. A catalyst composition is disposed on (i.e., on or within) a substrate to form a catalytic element. A catalyzed diesel particulate filter (CDPF) comprises a catalytic element comprising a substrate and the catalyst composition. The catalyst composition comprises a noble metal component, a promoter oxide component, and a refractory inorganic oxide component.

The noble metal component comprises a noble, metal, for example, platinum, palladium, gold, rhodium, iridium, osmium, ruthenium, and the like, as well as oxides, alloys, and combinations comprising one or more of the foregoing noble metal components. Preferred noble metals include, for example, platinum, palladium, and combinations comprising at least one of the foregoing noble metals. The catalyst composition can comprise about 0.8 weight percent (wt %) to about 30 wt % of the noble metal, based on the total weight of the catalyst composition. Within this range, greater than or equal to about 2.0 wt % of the noble metal is preferred, with greater than or equal to about 3.5 wt % of the noble metal more preferred. Also preferred within this range is less than or equal to about 20 wt % of the noble metal, with less than or equal to about 15 wt % of the noble metal more preferred.

The promoter oxide component can facilitate the oxidation of particulate matter by the noble metal. The promoter oxide component may also provide additional oxygen species in the event of local oxygen deficit during fast combustion at the noble metal component. The promoter oxide component can comprise a charge variable transition metal oxide, a rare earth oxide, or a combination comprising at least one of the foregoing promoter oxides. The charge variable transition metal oxide can be, for example, vanadium oxide, chromium oxide, manganese oxide, iron oxide, cobalt oxide, copper oxide, zinc oxide, nickel oxide, or a mixture comprising at least one of the foregoing oxides. The rare earth oxide can be an oxide of a lanthanide group metal, for example, an oxide of lanthanum, cerium, praseodymium, neodymium, promethium, samarium, europium, gadolinium, terbium, dysprosium, holmium, erbium, thulium, ytterbium, or a combination comprising at least one of the foregoing rare earth oxides. Preferred promoter oxide components include, for example, cerium oxide, cobalt oxide, copper oxide, manganese oxide, and combinations comprising at least one of the foregoing promoter oxides.

The catalyst composition can comprise about 0.5 wt % to about 95 wt % of the promoter oxide, based on the total weight of the catalyst composition. Within this range, greater than or equal to about 5 wt % promoter oxide can be employed, with greater than or equal to about 10 wt % promoter oxide preferred, and greater than or equal to about 25 wt % promoter oxide more preferred. Also within this range, less than or equal to about 80 wt % promoter oxide can be employed, with less than or equal to about 70 wt % promoter oxide preferred, and less than or equal to about 55 wt % promoter oxide more preferred.

The refractory inorganic oxide component preferably comprises an inorganic oxide having thermal stability at temperatures up to about 800° C. and tolerance to sulfur. The refractory inorganic oxide preferably has a surface area of greater than or equal to about 1 square meter per gram. Suitable refractory inorganic oxide components include, for example, aluminum oxide (e.g., alpha aluminum oxide, delta aluminum oxide, and gamma aluminum oxide; wherein the aluminum oxide may be doped, e.g., silica doped, lanthanum doped, and the like), titanium oxide, zirconium oxide, and combinations comprising at least one of the foregoing refractory inorganic oxides. Preferred refractory inorganic oxide components include, for example, delta aluminum oxide, silica doped aluminum oxide, and combinations comprising at least one of the foregoing refractory inorganic oxides. The catalyst composition can comprise about 5 wt % to about 99 wt % refractory inorganic oxide, based on the total weight of the catalyst composition. Within this range, greater than or equal to about 10 wt % refractory inorganic oxide is preferred, with greater than or equal to about 25 wt % refractory inorganic oxide more preferred. Also within this range, less than or equal to about 95 wt % refractory inorganic oxide is preferred, with less than or equal to about 60 wt % refractory inorganic oxide more preferred.

In addition to acting as a support for the noble metal component and the promoter oxide component (i.e., the active catalyst components), the refractory inorganic oxide component may facilitate binding of the active catalyst components (i.e., it facilitates catalyst integrity). The refractory inorganic oxide also promotes the dispersion of the active catalyst components to improve catalyst performance.

The catalyst composition is preferably formed in a stepwise impregnation manner in which a solution comprising a promoter oxide component precursor is added to a refractory inorganic oxide to disperse and preferably impregnate at least a portion of the refractory inorganic oxide component with the promoter oxide component. The promoter oxide component precursor solution can be, for example, a metal salt solution such as metal nitrate or acetate. The refractory inorganic oxide and the promoter oxide precursor are then mixed to form a first slurry. Depending on the ratio of the components, the first slurry may be in the form of a wet powder. The first slurry is then calcined at a temperature of about 400° C. to about 700° C. for a period of up to about 4 hours, or so, to decompose the promoter oxide component, fix the promoter oxide on the inorganic oxide, and form a supported promoter.

A solution comprising a noble metal component precursor is then added to the supported promoter to form a second slurry. The noble metal solution can be a metal salt solution, such as palladium nitrate, palladium sulfite, platinum sulfite, $Pt(NH_3)_4(NO_3)_2$, platinum nitrate, and the like, as well as combinations comprising at least one of the foregoing metal salts, with the concentration of noble metal being readily varied to give the targeted noble metal/supported promoter ratio. The second slurry is then calcined at a temperature of about 400° C. to about 700° C. to disperse the noble metal on the supported promoter and form the catalyst composition.

Other methods may be used so long as good impregnation of the promoter oxide and noble metal on the refractory inorganic oxide is achieved. These methods include, but are not limited to, incipient-wetness pre-impregnation, co-precipitation, co-deposition of a noble metal solution with the promoter oxide and refractory inorganic oxide (pre-combined or separately applied) on the substrate, and sequential or co-impregnation of the substrate with the noble metal solution and promoter oxide precursor solution, such that the solution that contains the promoter oxide precursor is converted to the promoter oxide after calcination.

In the formation of the catalytic element, the catalyst composition is disposed on (i.e., on and/or throughout) a substrate. The substrate preferably is a wall-flow monolith having alternatively plugged channels and a size and geometry chosen to optimize the surface area in the particular design. The substrate comprises a material designed for use in a spark ignition or diesel engine environment and having the following characteristics: (1) capable of operating at temperatures up to or over about 1,000° C. or so, depending upon the device's location within the exhaust system; (2) capable of withstanding exposure to hydrocarbons, nitrogen oxides, carbon monoxide, particulate matter (e.g., soot, and the like), carbon dioxide, and/or sulfur; (3) having sufficient surface area and structural integrity to support the catalyst composition; and (4) a wall material is a porous material that can allow exhaust gas to pass through while the particulates in the exhaust are trapped. Some possible materials include cordierite, silicon carbide (SiC), metal, glasses, and the like, and combinations comprising at least one of the foregoing materials. Some ceramic materials include SiC diesel filter, commercially available from Ibiden Co. Ltd. Japan, and "EX-80", commercially available from Corning, Inc., Corning, N.Y. These materials can be in the form of foils, porous materials, fibers, sponges, and the like, e.g., metallic foils, metal wire mesh, sintered metal, glass fibers, open pore aluminum oxide sponges, and porous ultra-low expansion glasses.

A monolithic diesel particulate filter substrate can be a wall flow filter comprising honeycombed, porous crystalline ceramic (e.g., cordierite, SiC, SiN, or the like), or other materials (e.g., glass fiber, and the like). Alternate channels of the honeycombed structure are preferably plugged such that exhaust gas enters in one cell, is forced through the porous walls of the cell, and then exits the structure through another cell. The size and geometry of the diesel particulate filter substrate depend upon the particular application. The average pore size of the substrate is typically about 0.5 micrometers (μm) to about 500 micrometers, with a typical porosity being about 5% to about 80% of the open pore volume.

FIG. 1 shows a view of a portion of a wall flow substrate 2 containing inlet channels 4 and outlet channels 8. As the exhaust gas 3 reaches the front end of the treatment element, it can only enter into the inlet channels 4. The front ends of the outlet channels 8 are plugged and do not allow exhaust gas to enter. The end of inlet channels 5 are also plugged so that the exhaust gas is forced to pass through the porous walls 7 and flow out from the outlet channels 8 in which the front end is plugged but rear end is open.

In one embodiment, the distribution of the catalyst composition near the inlet wall surface 6 of the inlet channels 4 can be controlled such that the catalyst composition remains on or close to the inlet wall surface 6, i.e., the catalyst composition does not penetrate deeply into the inlet wall 7. In this embodiment, the outlet channels 8 optionally comprise substantially no catalyst composition. By on or close to the inlet wall surface 6, it is meant that the catalyst composition penetrates the inlet wall surface 6 of the substrate 2 by less than or equal to about 95% in depth of the wall 7 thickness, preferably by less than or equal to about 50% in depth of the wall 7 thickness, with less than or equal to about 25% more preferred. Generally, the distribution of the catalyst components along the inlet walls 7 of the substrate 2 can be controlled so as to be substantially uniform.

Optimizing the particle size of the catalyst slurry, based upon the substrate pore diameter, can control the distribution of the catalyst composition near the inlet wall surface 6. In general, the average particle size (i.e., the diameter measured along the major axis of the particle) of the solids in the final catalyst slurry (e.g., the slurry comprising the noble metal component precursor disposed on the supported promoter) is about 2 micrometers to about 10 micrometers. For example, when coating a silicon carbide substrate having an average pore diameter of about 9 micrometers, the average particle size of the solids in the slurry used to dispose the catalyst composition on the substrate should be greater than or equal to about 2 micrometers. In the case of this silicon carbide substrate, if the catalyst slurry particle size is less than or equal to about 1 micrometer, the slurry will pass though the substrate wall and appear at the surface of the outlet channel. If the particle size is too big, however, particle settling will occur and an inhomogeneous catalyst distribution may occur. Thus, to achieve the desired catalyst distribution with regard to the inlet wall surface 6 of the substrate, the particle size (of the solids in the catalyst slurry) is about 10% of the pore size of the substrate to about 80% of the pore size of the substrate. Within this range, an average particle size of greater than or equal to about 25% of the average pore size of the substrate is preferred, with an average pore size of greater than or equal to about 20% of the average pore size of the substrate even more preferred. Also within this range, an average particle size of less than or equal to about 50% of the average pore size of the substrate is preferred, with an average pore size of less than or equal to about 35% of the average pore size of the substrate more preferred.

The catalyst composition can be disposed on the substrate such that a minimal backpressure increase is observed as exhaust passes through the substrate along the exhaust gas flow path 20. The backpressure increases with an increase in the amount of particulates collected in the trap. If the backpressure is too high, the engine performance may be hampered. Thus the diesel particulate filter should keep the backpressure at a minimal level at the beginning of use as well as after a large amount of particulates have been collected in the trap. It is preferred that the backpressure across the catalyzed diesel particulate filter is less than or equal to about 30% of that of the comparable uncatalyzed diesel particulate filter, more preferably less than or equal to about 10% of that of the comparable uncatalyzed diesel particulate filter.

The catalyst composition can be employed in an amount sufficient to catalyze a reduction in concentration of at least one exhaust gas component. In addition, if the catalyst composition can be deposited on the substrate in an amount such that the increase in backpressure across the catalyzed diesel particulate filter (from the filter without the catalyst composition to the filter with the catalyst composition) is less than or equal to about 30%, with less than or equal to about 10% backpressure increase more preferred. The catalyst composition loading can be about 0.02 to about 2.0 g/in$^3$ (grams of catalyst per cubic inch of substrate volume) (i.e., about 1.2 to about 122 g/L (grams per liter) of substrate volume). Within this range, a catalyst composition loading of about 0.05 to about 1.0 g/in$^3$ (i.e., about 3.1 to about 61 g/L of substrate volume) is preferred. A preferred noble metal (provided by the noble metal component) loading density is about 1.0 to about 200 g/ft$^3$ of substrate (i.e., about 0.04 to about 7.1 g/L of substrate volume) with about 5 to about 100 g/ft$^3$ (i.e., about 0.2 to about 3.5 g/L of substrate volume) more preferred. A preferred loading density of the metal provided by the promoter oxide component is about 0.01 to about 1.8 g/in$^3$ (i.e., about 0.6 to about 110 g/L of substrate volume) with about 0.025 to about 0.9 g/in$^3$ (i.e., about 1.5 to about 55 g/L of substrate volume) more preferred.

Figure 2:
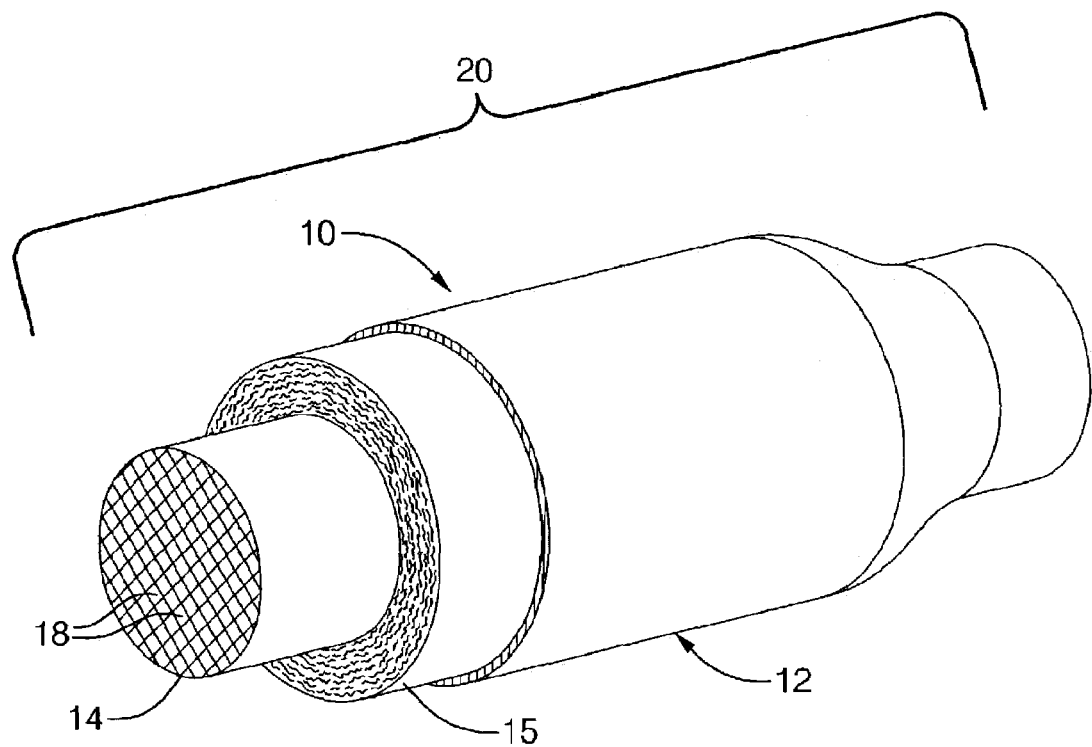
FIG. 2 is a partially cut-away cross-sectional perspective view of a catalyzed diesel particulate filter.

Referring to FIG. 2, catalyzed diesel particulate filter 10 is illustrated. The catalyzed diesel particulate filter 10 comprises an outer shell 12, a catalytic element 14, and a retention element disposed therebetween. A catalyzed diesel particulate filter shell 12 is a protective metal layer that is disposed around the catalytic element 14 and retention element 16. The shell is of a shape and size that is suitable to contain the catalyst composition and to protect it from such operating conditions as severe mechanical shocks. The choice of material for the shell depends upon the type of exhaust gas, the maximum temperature reached by the catalyst substrate, the maximum temperature of the exhaust gas stream, and the like. Suitable materials for the shell comprise materials that are capable of resisting under-car salt, temperature and corrosion. Typically, ferrous materials are employed such as ferritic stainless steels. Ferritic stainless steels can include stainless steels such as, e.g., the 400-Series such as SS-409, SS-439, and SS-441, with grade SS-409 generally preferred.

Located between the shell 12 and the catalytic element 14 is a retention member 16. The function of the retention member is to hold the catalyst substrate in place and, in some instances, to insulate the shell from the heat of the substrate during operation. The retention material can either be an intumescent material (e.g., one which contains ceramic materials, and optionally materials such as organic binders and the like, and a vermiculite component that expands with heating to maintain firm uniform compression, or non-uniform compression, if desired) or a non-intumescent material, as well as materials that include a combination of both. The retention member 16 can be in various forms, including fibers, pellets, mat (woven and non-woven), and the like, as well as combinations comprising at least one of the foregoing forms.

The following non-limiting examples are intended to illustrate embodiments of catalytic elements.

EXAMPLES

For the following Examples, the testing conditions were as follows:
Soot Loading:
Engine: Peugeot 2.0 liters DW10 (Common Rail)
Engine speed (revolutions per minute (rpm))=3,000;
engine torque=30 Newton meters (Nm)
Inlet temperature: 200° C.-250° C.
Duration: 3 hr 15 minutes (min) (soot loading of about 20 grams per 2.5 liter (L) part (5.66 inches (in)×6 in))
Fuel: commercial diesel (350 parts per million (ppm) max sulfur)
The catalysts were loaded with soot and then regeneration was run to see how soot burning behaved.
Regeneration Condition:
Engine: Peugeot 2.0 L DW10 (Common Rail)
Engine speed: 3,000 rpm
Engine torque: 50 to 125 Nm by step (15 Nm per step), then to 200 Nm, 230 Nm
Duration of each step: 20 min
Temperature: 280° C. to 520° C. by step; about 30° C. per step
Fuel: commercial diesel (350 ppm maximum of sulfur)

Example 1

Particulate Matter Combustion Performance

Figure 3:
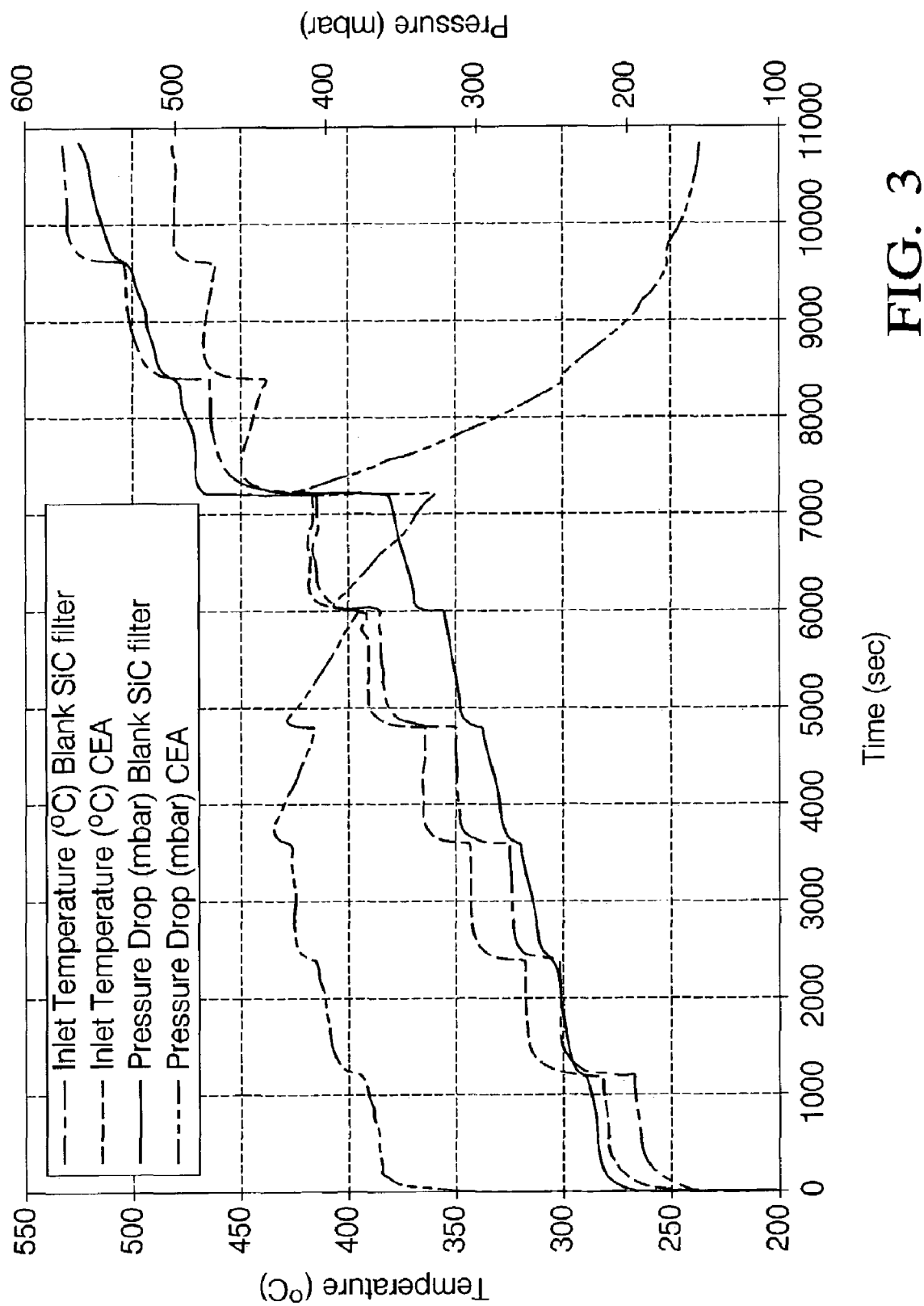
FIG. 3 shows the particulate matter combustion performance of the disclosed catalyzed diesel particulate filter compared to an uncatalyzed diesel particulate filter.

A catalytic element A ("CEA") was formed by forming a slurry of cerium acetate solution and aluminum oxide, and calcining the slurry at 540° C. for 2 hours to form a supported cerium oxide. The supported cerium oxide was mixed with platinum nitrate, and then calcined at 540° C. for 2 hours to form the catalyst composition. A slurry of the catalyst composition was then formed by combining the catalyst composition with water. The slurry was milled to obtain particles having an average particle diameter of about 2.5 micrometers to about 3.0 micrometers. Inlet channels in an Ibiden SiC substrate (5.66 in round by 6 in long, Fd series, 200 cells per square inch (cpsi) cell density, 0.41 millimeters (mm) wall thickness, 9 micrometer average pore diameter, and 42% porosity), were then coated with the catalyst composition slurry. The coated substrate was then calcined at 540° C. for 2 hours to form a catalytic element having a refractory inorganic aluminum oxide coating at a loading of 0.07 $g/in^3$, a cerium oxide a loading of 0.07 $g/in^3$; and platinum metal loading of 36 $g/ft^3$. The particulate matter combustion performance of this catalytic element A is shown in FIG. 3.

The control level of combustion of particulate matter on a blank filter (without catalyst) is also plotted for comparison. For this test, each diesel particulate filter was pre-loaded with about 8 grams of particulate matter (e.g., carbon) per liter of substrate volume prior to the regeneration test. The particulate matter-loaded substrate was placed in communication with an exhaust line. The engine exhaust temperature is stepwise increased by increasing the engine load while keeping the engine speed constant. It can be seen from FIG. 3 that when increasing diesel particulate filter inlet temperature, the flow restriction (pressure drop) across the part also increases. This increase in pressure drop (in millibars, mbar) is partly due to the increase of temperature, and partly due to continuous accumulation of particulate matter on the diesel particulate filter.

For the catalyzed diesel particulate filter (catalytic element A), the pressure drop stops increasing at temperature of about 340° C. In other words, a "balance point" is reached at that temperature. At this balance point, the rate of particulate matter accumulation and the rate of particulate matter removal are equal. With further increases in the temperature, the pressure starts to drop, first slowly. In contrast to the catalyzed diesel particulate filter (CEA), there is a monoclinic continual pressure increase for the uncatalyzed or control diesel particulate filter throughout the entire test cycle.

Example 2

Effect of Noble Metal

Addition of precious metal (i.e., a three-component catalyst vs. a two-component catalyst) can substantially improve the particulate matter combustion activity of a catalyst. A second catalytic element was made to demonstrate the importance of the noble metal on catalyst performance. Catalytic element B ("CEB") was a two-component formulation (0.07 $g/in^3$ cerium oxide (promoter oxide) plus 0.07 $g/in^3$ aluminum oxide) formed on an Ibiden SiC, 5.66 in by 6 in, Fd-200/12 substrate. This catalytic element B was formed by forming a slurry of cerium acetate and aluminum oxide, and calcining the slurry at 540° C. for 2 hours to form a supported cerium oxide. A slurry of the supported cerium oxide was then formed by combining it with water. The slurry was milled to obtain particles having an average particle diameter of about 2.5 micrometers to about 3.0 micrometers. Inlet channels in the substrate were then coated with the slurry, and the coated substrate was then calcined at 540° C. for 2 hours.

Figure 4:
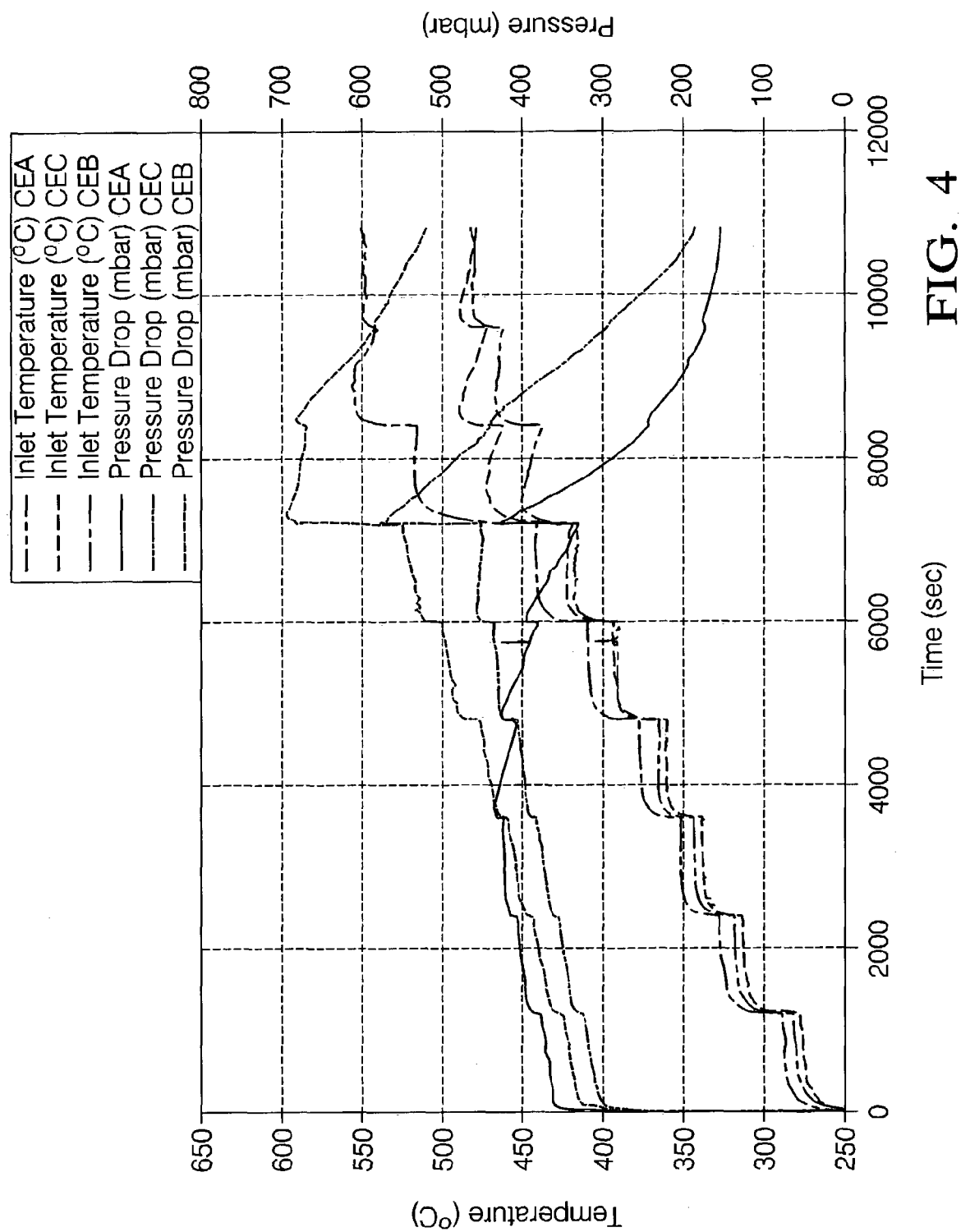
FIG. 4 shows the particulate matter combustion performance of the disclosed catalyzed diesel particulate filter compared to a diesel particulate filter with a two-part catalyst (without noble metal) and to a catalyzed diesel particulate filter that was prepared by a method that allows catalyst component distribution throughout the entire substrate (inlet and outlet of wall, and inside the wall).

It can be seen clearly from FIG. 4 that the diesel particulate filter comprising platinum is more active than the diesel particulate filter with no platinum. The sample containing platinum shows a pressure decrease at temperature of 365° C., but the sample that does not contain platinum does not show pressure decrease until 520° C.

Example 3

Effect of Particle Sizes in the Catalyst Slurry on Performance

The particle size of the catalyst slurry can be controlled during the coating to prevent the catalyst slurry from penetrating deeply into the substrate wall. The penetration of the catalyst slurry inside the wall may cause the loss of contact between the catalyst and the particulate matter, thus lowering particulate matter combustion activity. The effect of particle size can be seen in the comparison of a sample coated with large particle size slurry (average particle size of the solids in the slurry used to coat the substrate is about 2.5 micrometers to about 3.0 micrometers) (i.e., CEA) and a sample coated with a small particle size slurry (average particle size of the solids in the slurry used to coat the substrate is less than or equal to 1.0 micrometer) (catalytic element C ("CEC")), in FIG. 4.

In the washcoating with small particle size slurry, the catalyst slurry passed through substrate wall and exited from the outlet end of the substrate. This phenomenon was not seen with large particle size slurry, suggesting an improvement in retention of the catalyst on the inlet wall side of the substrate. In addition, the diesel particulate filter made using the large particle slurry (i.e., CEA) starts to have a pressure decrease at about 50° C. lower than that of the diesel particulate filter made from the small particle slurry (i.e., CEC; this was made in the same fashion as CEA, however, the milling was performed until the small particle sizes had been obtained.). Thus, the distribution of the catalyst components affects the performance of the diesel particulate filter.

Example 4

Effects of Stepwise Deposition of Catalyst Components

Figure 5:
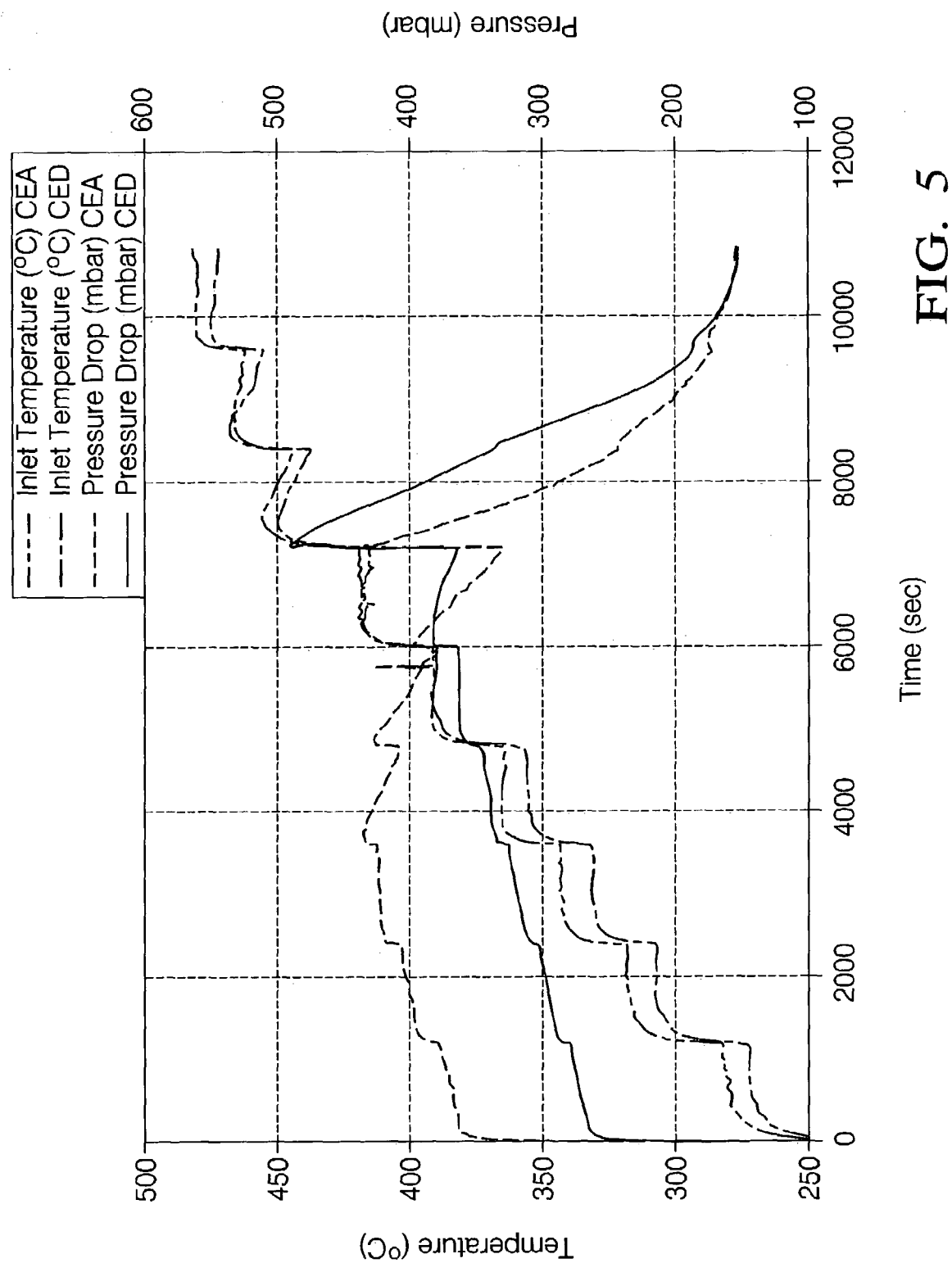
FIG. 5 shows the particulate matter combustion performance of an embodiment of the disclosed catalyzed diesel particulate filter compared to a diesel particulate filter formed by other methods.

The benefit of stepwise impregnation of the promoter and the noble metal in forming the catalyst slurry is demonstrated in FIG. 5. The catalytic element A was made by stepwise impregnation of promoter oxide and noble metal onto refractory inorganic oxide prior to washcoating as described above. Another element, catalytic element D ("CED"), was made by dividing the noble metal powder into two portions, followed by separately impregnating the portions onto the inorganic oxide and the promoter oxide. Two slurries were prepared; one comprising platinum nitrate and aluminum oxide, and a second comprising platinum nitrate and cerium-zirconium oxide. The slurries were each calcined at 540° C. for 2 hours. The calcined materials were then mixed in water and milled until particles having an average particle diameter of about 2.5 micrometers to about 3.0 micrometers had been obtained. The substrate (Ibiden SiC, 5.66 in by 6 in, Fd-200/14 substrate) was then coated with the slurry and calcined at 540° C. for 2 hours. In this preparation, the promoter oxide was not dispersed on the inorganic oxide, and not all of the platinum metal was in close contact with the promoter oxide. It can be seen in FIG. 5 that the pressure drop begins 50° C. lower for the diesel particulate filter made by stepwise integration (i.e., CEA) than that formed by mixing the powders prior to slurry formation (i.e., CED). Thus, the stepwise impregnation protocol can result in improved performance of the catalyzed diesel particulate filter.

Example 5

Reduced Hydrocarbon and Carbon Monoxide Emission

Figure 6:
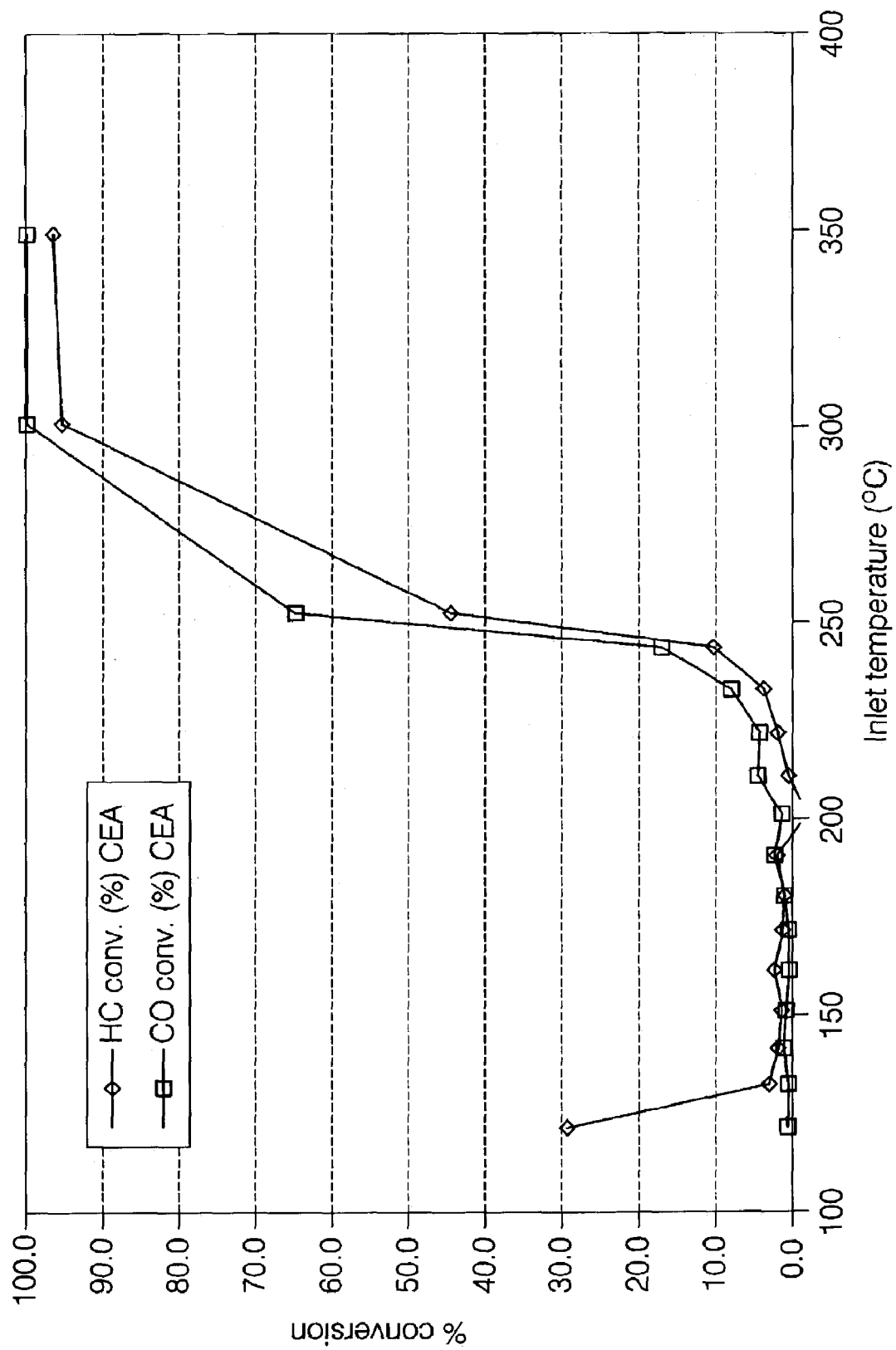
FIG. 6 shows the hydrocarbon and carbon monoxide combustion for the disclosed catalyzed diesel particulate filter.

The introduction of catalyzed diesel particulate filters into an exhaust stream not only catalyzes the regeneration of a particulate material-loaded diesel particulate filter at a much lower temperatures, but also reduces the emission of hydrocarbons and carbon monoxide from the exhaust stream by oxidizing them under normal engine operation conditions. Hydrocarbon (HC) and carbon monoxide (CO) oxidation activity of catalytic element A is shown in FIG. 6. Hydrocarbon and carbon monoxide lightoff (about 50% of conversion) occurs at about 250° C. This feature allows the catalyzed diesel particulate filter to simultaneously reduce particulate material, hydrocarbons and carbon monoxide in diesel aftertreatment applications.

Example 6

Catalyst Stability

Figure 7:
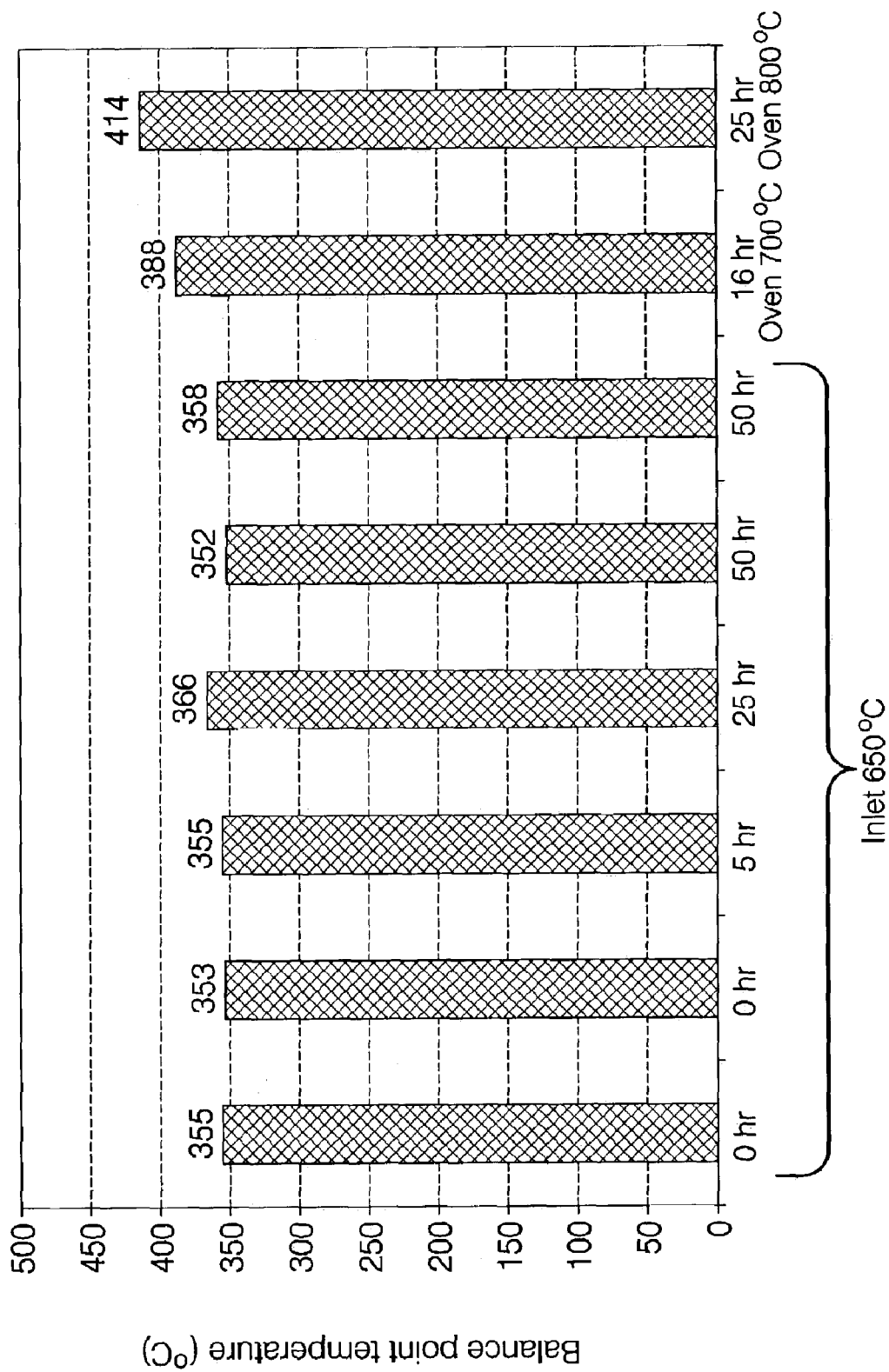
FIG. 7 shows the balance point temperature for an embodiment of the disclosed catalyzed diesel particulate filter after different aging treatments.

Good hydrothermal stability can be achieved by the catalyst preparation process and by the selection of catalyst components. FIG. 7 shows the balance point temperatures (where soot accumulation and combustion rates are equal) of the catalytic element A diesel particulate filter after different aging treatments. For a normal diesel catalyst, an engine dynometer aging cycle (AC-1) was developed that mimics an 80,000 kilometer road aging. This AC-1 employs a catalyst inlet temperature of 650° C. and a duration of 50 hours. To simulate more severe aging conditions, a 700° C. oven aging with 10 volume percent (vol %) steam (balance air) and a duration of 16 hours were employed. This condition is very severe for normal diesel catalysts. Furthermore, an 800° C. oven aging with 10 vol % steam (balance air) and a duration of 25 hours were applied to mimic even extreme conditions that the catalyzed diesel particulate filter may experience. It can be seen that the catalyst showed essentially no deactivation with 50 hours of LAL-460 aging. Slight deactivation was observed after 700° C. oven aging. After 800° C. oven aging, the deactivation was more prominent. The overall performance of the most severely aged catalyst, however, was much better than that of an uncatalyzed diesel particulate filter.

The disclosed methods are employed to produce a catalyzed diesel particulate filter and catalytic element that have good catalytic performance, good hydrothermal stability, and a low backpressure across the filter. First, the stepwise impregnation of the three catalyst components to form the catalyst slurry improves catalyst performance by allowing close contact of the three catalyst components, and also reduces sintering of the noble metal and promoter metal components. Compared to prior methods, the stepwise formation of the catalyst slurry reduces the temperature at which the pressure drop begins across the filter by as much as 50° C. or even greater. In addition to removing particulate matter from an exhaust stream, the catalytic element is active for hydrocarbon and carbon monoxide oxidation. Preferably, catalyst light off is achieved at an exhaust stream at a temperature of about 250° C. (i.e., the temperature that about 50% of the hydrocarbons present (50% reduction in concentration), 50% of the carbon monoxide present, or both are oxidized). In addition, the disclosed catalyzed diesel particulate filter has good stability in conditions that mimic on-road aging (e.g., temperature and humidity). Preferably, the catalytic element exhibits less than or equal to about 25° C. increase in a balance point temperature after aging at 650° C. for 50 hours, with less than or equal to about 15° C. increase preferred, and less than or equal to about 10° C. increase more preferred. It is also preferred that the catalytic element exhibit a less than or equal to about 35° C. increase in a balance point temperature after aging at 700° C. for 16 hours in 10% steam, with a less than or equal to about 20° C. increase more preferred. Further preferred is an increase in balance point temperature after aging at 800° C. for 25 hours in 10% steam of less than or equal to about 70° C., with less than or equal to about 60° C. more preferred.

Second, the loading of the catalyst on the substrate can be controlled at the inlet wall surface. Control of the catalyst loading can be achieved, at least in part, by controlling the particle size of the catalyst slurry. If the particle size is too small compared to the pore size of the substrate, the catalyst will flow through the substrate upon application. If, however, the particle size is too big, the catalyst particles can settle leading to a large loading gradient and/or an inhomogeneous catalyst distribution. Control of catalyst loading leads to a catalyzed diesel particulate filter having a reduction in the temperature at which the pressure drop begins across the filter by as much as about 50° C. or even higher. Further, the disclosed catalyzed diesel particulate filter has the advantage of reducing emissions of both hydrocarbons and carbon monoxide in addition to particulate matter.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for making a diesel particulate filter, comprising:
    providing a wall-flow substrate comprising an inlet channel and an outlet channel and a porous wall separating the inlet channel and the outlet channel, said porous wall comprising an inlet wall surface adjacent the inlet channel and an outlet wall surface adjacent the outlet channel, said wall-flow substrate being characterized by a thickness between the inlet wall surface and the outlet wall surface and by pores having an average pore size between 5 micrometers and 500 micrometers;
    applying a promoter oxide compound onto refractory inorganic oxide particles by forming a first slurry of the refractory inorganic oxide particles dispersed in a solution containing a precursor of the promoter oxide compound and calcining to form the promoter oxide compound and deposit the promoter oxide compound onto the refractory inorganic oxide particles, thereby forming supported promoter particles;
    impregnating the supported promoter particles with a noble metal catalyst to form catalyst-bearing particles;
    sizing the catalyst-bearing particles to an average particle diameter of about 2 micrometers to about 10 micrometers, wherein the particle size is about 10% to about 80% of the average pore size;
    applying the sized catalyst-bearing particles to the inlet wall surface of the wall-flow substrate and not to the outlet wall surface, said catalyst-bearing particles being applied by applying a second slurry comprising the sized catalyst-bearing particles and calcining to cause said catalyst-bearing particles to penetrate within the pores of the porous wall to a distance not greater than about 25% of the thickness of the porous wall.

2. The method of claim 1, wherein the average composition particle size is about 20% to about 50% of the average pore size.

3. The method of claim 2, wherein the average composition particle size is about 25% to about 35% of the average pore size.

4. The method of claim 1, wherein the catalyst composition loading is about 1.2 g/L of substrate volume to about 122 g/L of substrate volume.

5. The method of claim 1, wherein the diesel particulate filter has less than or equal to an about 15° C. increase in a balance point temperature after aging at 650° C. for 50 hours.

6. The method of claim 1, wherein the diesel particulate filter has less than or equal to an about 35° C. increase in a balance point temperature after aging at 700° C. for 16 hours in 10% steam.

7. The method of claim 1, wherein the diesel particulate filter has less than or equal to an about 70° C. increase in a balance point temperature after aging at 800° C. for 25 hours in 10% steam.

8. The method of claim 1, wherein the noble metal is selected from the group consisting of platinum and palladium.

9. A method for making a diesel particulate filter, comprising:
    providing a wall-flow substrate comprising an inlet channel and an outlet channel and a porous wall separating the inlet channel and the outlet channel, said porous wall comprising an inlet wall surface adjacent the inlet channel and an outlet wall surface adjacent the outlet channel, said wall-flow substrate being characterized by a thickness between the inlet wall surface and the outlet wall surface and by pores having an average pore size between 5 micrometers and 500 micrometers;
    applying a promoter oxide compound onto refractory inorganic oxide particles by forming a first slurry of the refractory inorganic oxide particles dispersed in a solution containing a precursor of the promoter oxide compound and calcining to form the promoter oxide compound and to deposit the promoter oxide compound onto the refractory inorganic oxide particles, thereby forming supported promoter particles, wherein the promoter oxide compound comprises an element selected from the group consisting of vanadium, chromium, manganese, iron, cobalt, copper, zinc, nickel, lanthanum, cerium, praseodymium, neodymium, promethium, samarium, europium, gadolinium, terbium, dysprosium, holmium, erbium, thulium, and ytterbium,
    impregnating the supported promoter particles with a noble metal catalyst to form catalyst-bearing particles, said noble metal being selected from the group consisting of platinum and palladium;
    sizing the catalyst-bearing particles to an average particle diameter of about 2 micrometers to about 10 micrometers, wherein the particle size is about 10% to about 80% of the average pore size;
    applying the sized catalyst-bearing particles to the inlet wall surface of the wall-flow substrate and not to the outlet wall surface, said catalyst-bearing particles being applied by applying a second slurry comprising the sized catalyst-bearing particles and calcining to cause said catalyst-bearing particles to penetrate within the pores of the porous wall to a distance not greater than about 25% of the thickness of the porous wall.

10. The method of claim 9, wherein the refractory inorganic oxide particles are composed of a refractory inorganic oxide selected from the group consisting of aluminum oxide, doped aluminum oxide, titanium oxide, zirconium oxide, and a combination comprising at least one of the foregoing refractory inorganic oxide components.

11. The method of claim 10, wherein the refractory inorganic oxide particles are composed of a refractory inorganic oxide selected from the group consisting of delta aluminum oxide, silica doped aluminum oxide, lanthanum doped aluminum oxide, and a combination comprising at least one of the foregoing refractory inorganic oxide components.

* * * * *